(12) United States Patent
Ghaibeh

(10) Patent No.: US 8,204,070 B1
(45) Date of Patent: Jun. 19, 2012

(54) BACKPLANE DEVICE FOR NON-BLOCKING STACKABLE SWITCHES

(75) Inventor: Gihad Ghaibeh, Moss Beach, CA (US)

(73) Assignee: Extreme Networks, Inc., Santa Clara, CA (US)

( * ) Notice: Subject to any disclaimer, the term of this patent is extended or adjusted under 35 U.S.C. 154(b) by 347 days.

(21) Appl. No.: 12/550,261

(22) Filed: Aug. 28, 2009

(51) Int. Cl.
    H04L 12/28 (2006.01)
(52) U.S. Cl. .................................. 370/419; 370/254
(58) Field of Classification Search .......... 370/386–391, 370/254, 419, 244, 250, 400, 421–425; 709/208–209; 710/2, 100, 300–302, 317
    See application file for complete search history.

(56) References Cited

U.S. PATENT DOCUMENTS

| | | | | |
|---|---|---|---|---|
| 5,802,333 A * | 9/1998 | Melvin | ........................ | 710/316 |
| 6,023,471 A * | 2/2000 | Haddock et al. | ............... | 370/426 |
| 6,785,272 B1 * | 8/2004 | Sugihara | ........................ | 370/386 |
| 6,793,539 B1 * | 9/2004 | Lee et al. | ....................... | 439/701 |
| 6,934,292 B1 * | 8/2005 | Ammitzboell | ................. | 370/400 |
| 7,184,441 B1 * | 2/2007 | Kadambi et al. | ............... | 370/400 |
| 7,336,622 B1 * | 2/2008 | Fallis et al. | ..................... | 370/252 |
| 7,366,208 B2 * | 4/2008 | Bowes | ........................... | 370/535 |
| 7,415,011 B2 * | 8/2008 | Garnett et al. | .................. | 370/386 |
| 7,586,909 B1 * | 9/2009 | Walrand et al. | ................ | 370/388 |
| 7,672,252 B2 * | 3/2010 | Fallis et al. | ..................... | 370/252 |
| 7,983,192 B2 * | 7/2011 | Ghaibeh et al. | ................ | 370/254 |
| 7,983,287 B2 * | 7/2011 | Musacchio et al. | ............ | 370/415 |
| 2002/0159449 A1 * | 10/2002 | Carson et al. | .................. | 370/389 |
| 2005/0058128 A1 * | 3/2005 | Carson et al. | .................. | 370/388 |
| 2005/0105560 A1 * | 5/2005 | Mann et al. | .................... | 370/503 |
| 2007/0014234 A1 * | 1/2007 | Santoso et al. | ................. | 370/216 |
| 2007/0081463 A1 * | 4/2007 | Bohra et al. | .................... | 370/235 |
| 2007/0248086 A1 * | 10/2007 | Petersen | ........................ | 370/389 |
| 2008/0137530 A1 * | 6/2008 | Fallis et al. | ..................... | 370/216 |
| 2009/0268748 A1 * | 10/2009 | Ghaibeh et al. | ................ | 370/419 |

* cited by examiner

Primary Examiner — Chuong T Ho
(74) Attorney, Agent, or Firm — Blakely Sokoloff Taylor & Zafman, LLP

(57) ABSTRACT

A backplane device to connect to a plurality of stackable network switch devices. According to one aspect of the intention, each of the plurality of stackable network switch devices can implement its own internal non-blocking switching. According to another aspect of the intention, the relative configuration of connectors and signal lines of the backplane device provide for a switch device to be readily connected into (or disconnected from) a switch stack implementing combined non-blocking switching.

16 Claims, 6 Drawing Sheets

BACKPLANE DEVICE FOR NON-BLOCKING STACKABLE SWITCHES

BACKGROUND OF THE INVENTION

1. Field of the Invention

The invention relates generally to the field of computer networking devices. More particularly, certain embodiments relate to a backplane device to connect a plurality of switching devices for combined non-blocking switching.

2. Background Art

Various stackable switch devices are capable of implementing their own internal non-blocking switching. Data packets received by such a stackable switch device may be switched through the stackable switch device—without any dropping of the data packet being caused by an insufficiency of the stackable switch device's data packet output capacity. Such a stackable switch device can be integrated to operate in combination with one or more other stackable switch devices, wherein a configuration of the multiple stackable switch devices allows the non-blocking capability of the one stackable switch device to be incorporated into an overall non-blocking characteristic which is demonstrated for the multiple stackable switch devices as a whole. Traditionally, different sets of individual connection cables have been used to connect different pairs of switch devices in a stack to one another. Depending on the size and configuration of the switch stack, the number of individual connecting cables can hinder the implementation, maintenance and/or reconfiguration of such stacks of switch devices.

BRIEF DESCRIPTION OF THE DRAWINGS

The various embodiments of the present invention are illustrated by way of example, and not by way of limitation, in the figures of the accompanying drawings and in which.

DETAILED DESCRIPTION

Figure 1A:
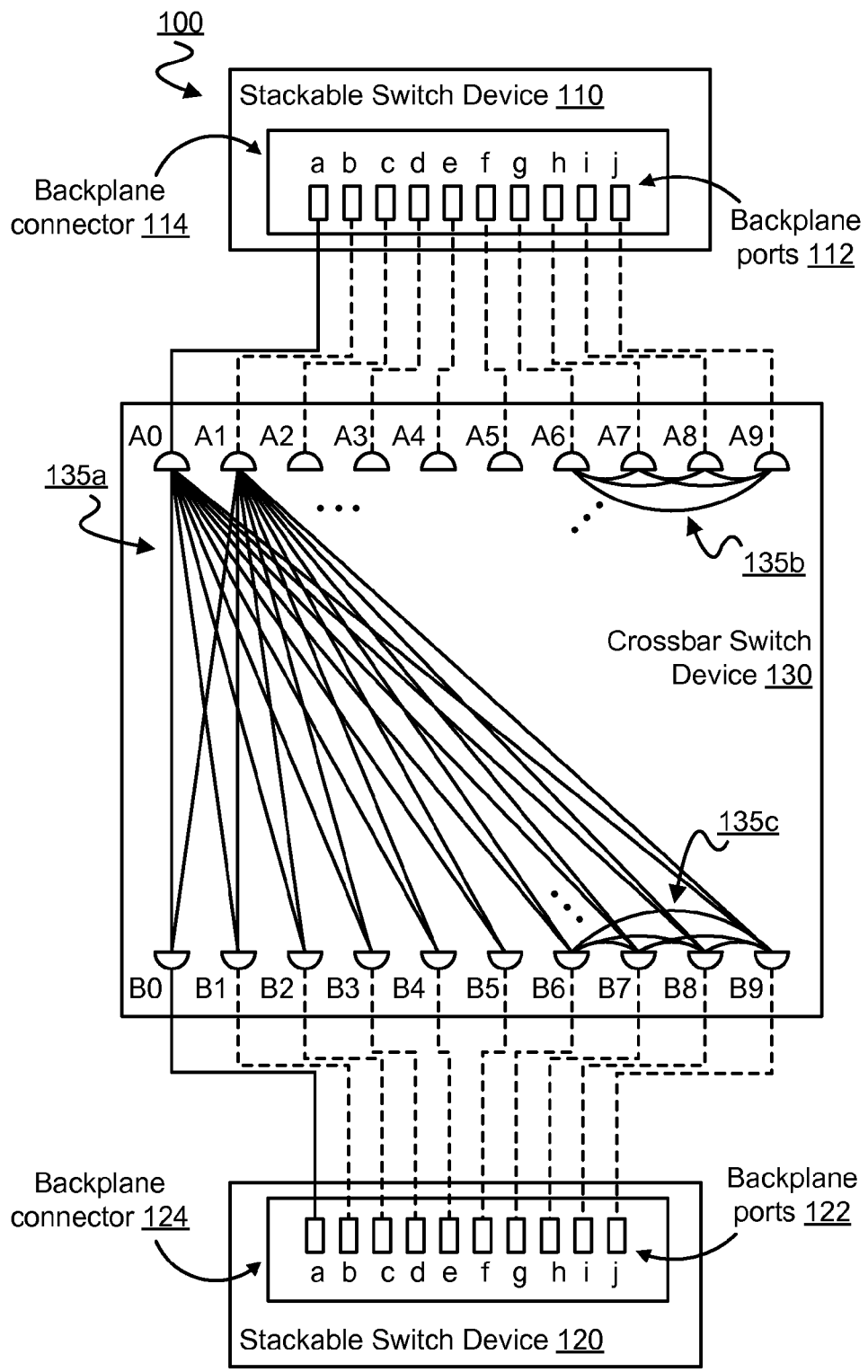
FIG. 1A is a block diagram illustrating select elements of a system of stacked switches according to an embodiment.

FIG. 1A illustrates select elements of a system 100, according to an embodiment, which is configured for non-blocking switching by a plurality of stackable switch devices. The system 100 may be connected to one or more networks (not shown) with which system 100 exchanges data packets. In an embodiment, system 100 may be connected to any of a variety of combinations of one or more local area networks (LANs), one or more wide area networks (WANs) and/or other similar computer networks capable of exchanging data packets—e.g. according to an Ethernet standard such as the Institute of Electrical and Electronics Engineers (IEEE) Std 802.3ae-2002 standard for 10 Gigabit Ethernet.

System 100 may include a plurality of stackable switch devices—e.g. including stackable switch devices 110, 120—to receive a data packet sent from the one or more networks for switched communication through system 100. It is understood that system 100 may include any of a variety of additional or alternative combinations of stackable switch devices. As used herein, a stackable switch device is understood to be stackable at least insofar as the switch device is operable in combination with one or more other stackable switch devices, wherein the "stack" of combined stackable switch devices demonstrates one or more operating characteristics as a single aggregate switch device.

A stackable switch device may be distinguished from a rack-mounted blade device, for example. For example, the management functionality for a stackable switch (e.g. CPU, memory, software user interface, etc.) may be contained in the stackable switch itself. Alternatively or in addition, a stackable switch device may be capable of independent operation via its own power supply. A stackable switch device may include any of a variety of combinations of hardware and/or software for packet testing and/or packet manipulation—e.g. to support implementation of Ethernet, VLAN, etc. switching techniques. By way of illustration and not limitation, a stackable switch device may analyze an incoming data packet in order to reference its own internal lookup table(s). Based on a lookup of the internal table, the stackable switch device may add a tag to the data packet before sending it to a crossbar switch—e.g. so that the crossbar switch can identify which port on the crossbar switch the packet is to be forwarded to. Since the stackable switch device manages tagging, table lookups and other relatively complex functions, the crossbar switch can have a simpler design—e.g. to simply forward data packets.

In an embodiment, the plurality of stackable switch devices 110, 120 may include one or more backplane input/output (I/O) ports—e.g. the respective backplane ports 112, 122 of stackable switch devices 110, 120—through which data packets received by system 100 are exchanged among the plurality of stackable switches 110, 120. It is understood that each of the plurality of stackable switches of system 100 may include any of a variety of additional or alternative combinations of backplane I/O ports. In an embodiment, stackable switch devices 110, 120 may also include respective network I/O ports (not shown) for data packet exchanges between system 100 and the one or more networks. Network data packets received at the network I/O ports of one of stackable switch devices 110, 120 may be variously switched to the other of stackable switch devices 110, 120 using the respective backplane outputs a through j of the stackable switch devices 110, 120. In an embodiment, multiple backplane ports may be included in a single backplane connector—e.g. one of the respective backplane connectors 114, 124 of stackable switch devices 110, 120.

In an embodiment, the exchange of data packets between stackable switch devices 110, 120 may further take place via at least one crossbar switch—e.g. the crossbar switch device 130 of system 100—which connects the stackable switch devices 110, 120 to one another. For example, one of more of the backplane ports a, b, . . . j of stackable switch device 110 may be communicatively coupled to one or more of I/O ports A0, A1, . . . A9 of the crossbar switch device 130. Moreover, one or more of the backplane ports a, b, . . . j of stackable switch device 120 may be communicatively coupled to one or more of I/O ports B0, B1, . . . B9 of the crossbar switch device 130. In various embodiments, one or more others of the backplane ports of stackable switch device 110 and/or stackable switch device 120 may be variously coupled to I/O ports of one or more other crossbar switch devices (not shown). Crossbar switch device 130 may operate as a switched matrix which provides full interconnection between all of its I/O ports A0, A1, ..., A9 and B0, B1, ..., B9. In an embodiment, a crossbar switch may include a forwarding engine which, for a packet received on one port, looks up the physical address of a second port, and sends the packet out that second port. More particularly, crossbar switch device 130 may switchedly provide for (1) the set of possible combinations 135a of communication between one of I/O ports A0, A2 ..., A9 and one of I/O ports B0, ..., B9, (2) the set of possible combinations 135b of communication between one of I/O ports A0, A2 ..., A9 and another one of I/O ports A0, A2 ..., A9, and (3) the set of possible combinations 135c of communication between one of I/O ports B0, B2 ..., B9 and another one of I/O ports B0, B2 ..., B9. For the sake of clarity in FIG. 1A, only some of the possible communications among I/O ports A0, A2 ..., A9 and one of I/O ports B0, ..., B9 are shown.

In an alternate embodiment, a crossbar switch device may include multiple sets of I/O ports, wherein different switching means of the crossbar switch device each provide for full interconnection between all ports of a respective one of the sets of I/O ports. An example of such an embodiment is discussed below in reference to FIG. 2B. In such an embodiment, the crossbar switch device may not include switching means to provide for communication between two of the sets of I/O ports. Nevertheless, combined non-blocking switching of multiple stackable switch devices may be possible, provided that each of the stackable switch devices is connected to one or more ports of each of the sets of I/O ports. In such an embodiment, combined non-blocking switching also requires that the respective interconnecting switching means for each set of I/O ports has sufficient packet forwarding bandwidth for all data traffic from the ports of the stackable switch devices which are connected to that set of I/O ports.

As discussed above, stackable switch devices 110, 120 may be stacked with one another for combined operation, wherein the combination of stacked switch devices exhibits some operational characteristic as a single aggregate switch device. One such operational characteristic is non-blocking switching, which will now be discussed to illustrate various features of an embodiment.

Stackable switch devices 110, 120 may each be capable of implementing their own individual non-blocking switching. Non-blocking switching refers to an ability of a switch device to provide a sufficiently large data packet output bandwidth to accommodate maximal use of its data packet input bandwidth. Consequently, when operating as a standalone switching device, a switching device which is capable of individual non-blocking switching may not perform any dropping of a received data packet which is due to exceeding that switching devices data packet output capacity.

In an embodiment wherein each of the plurality of stackable switch devices 110, 120 is individually capable of non-blocking switching, use of crossbar switch device 130 may allow for combined non-blocking switching to be supported across the plurality of stackable switching devices 110, 120. More particularly, by connecting all backplane ports of stackable switch devices 110, 120 to respective I/O ports of crossbar switch device 130 (e.g. as shown by the solid and dashed lines in FIG. 1A), the combined data packet output bandwidths of stackable switch devices 110, 120 may accommodate maximal use of the combined data packet input bandwidth of stackable switch devices 110, 120. Therefore, in an embodiment, no dropping of a data packet which is received by system 100 will be due to an exceeding of the combined data packet output capacity of stackable switch devices 110, 120 as a whole. Consequently, switching a data packet from one of stackable switch devices 110, 120 to the other of stackable switch devices 110, 120, for example, will not cause an exceeding of a data packet output bandwidth which results in a dropping of that data packet.

Although FIG. 1A illustrates crossbar switch device 130 as being connected to multiple I/O ports of each of stackable switch devices 110, 120, it is appreciated that in various embodiments, a crossbar switch device may be connected to as few as one port for each of a plurality of stackable switch devices supported by the crossbar switch device. It is also appreciated that a plurality of stackable switch devices may be connected to one or more crossbar switch devices, wherein the total number of respective connected ports on each the plurality of stackable switch devices is equal to the total number of the one or more crossbar switch device.

Figure 1B:
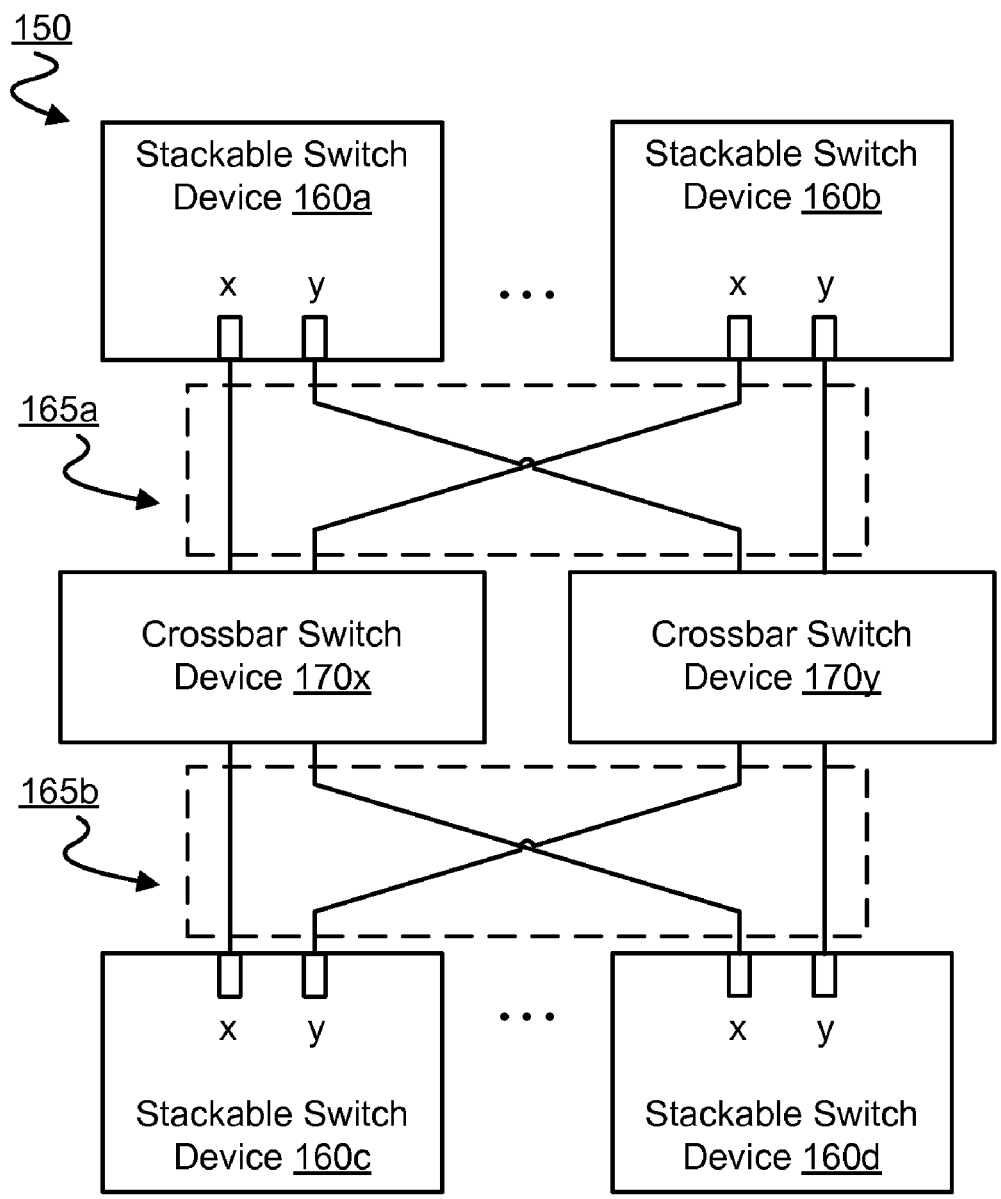
FIG. 1B is a block diagram illustrating select elements of a system of stacked switches coupled to multiple crossbar switch devices according to an embodiment.

By way of illustration, FIG. 1B shows select elements of a system 150 according to one embodiment, wherein a crossbar switch device 170x may be connected to one respective port (x) of each of multiple stackable switch devices—e.g. stackable switch devices 160a, 160b, 160c and 160d. System 150 may further include a second crossbar switch device 170y connected to one respective port (y) of each of the stackable switch devices 160a, 160b, 160c and 160d. In an embodiment, each of the multiple stackable switch devices 160a, 160b, 160c and 160d may have a respective total number of ports connected to the one or more crossbar switch devices 170x, 170y which is equal to the total number of the one or more crossbar switch devices 170x, 170y (e.g. two, in the illustrative case of FIG. 1B).

Where the system 150 is to provide combined non-blocking switching of the multiple stackable switch devices 160a, 160b, 160c and 160d, particular cross-connections 165a, 165b of each of the stackable switch devices 160a, 160b, 160c and 160d to each of the crossbar switch devices 170x, 170y may be required. In an embodiment, such cross-connections to allow combined non-blocking switching may be provided by a single backplane device (not shown). Features of such a backplane device according to various embodiments are described herein.

Figure 2A:
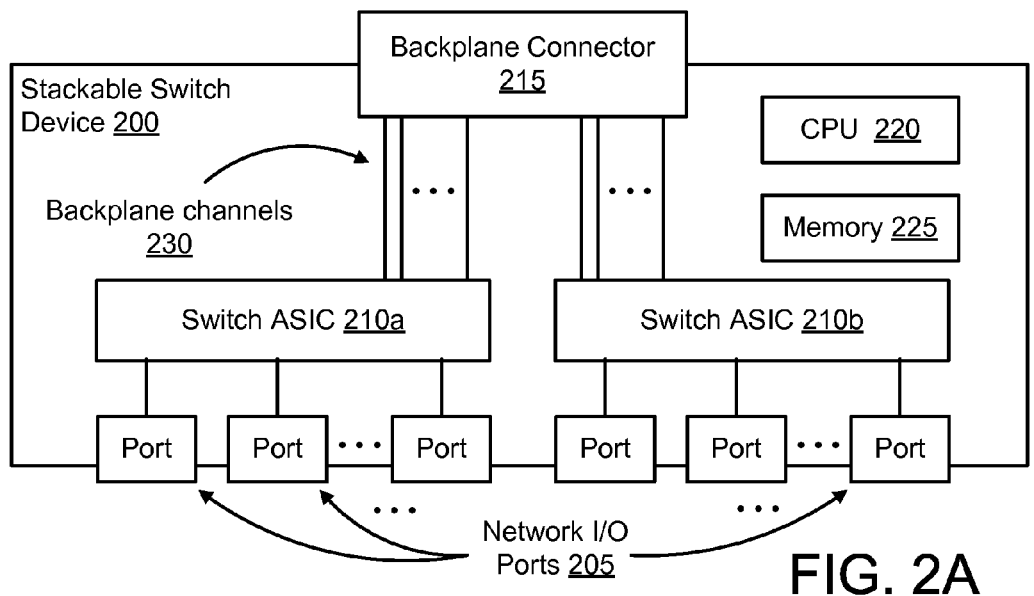
FIG. 2A is a block diagram illustrating select elements of a stackable switch of a system according to an embodiment.

FIG. 2A illustrates select elements of a stackable switch device 200—e.g. an Ethernet switch device—to implement non-blocking switching in a system according to an embodiment. Stackable switch device 200 may, for example, include one or more features of stackable switch devices 110, 120. In an embodiment, stackable switch device 200 may include one or more network I/O ports 205, through which the stackable switch device 200 sends and/or receives data packets—e.g. packets sent to and/or received from the one or more networks. Stackable switch device 200 may further include additional means for monitoring and/or managing this switched communication of data packets. For example, stackable switch device 200 may further include a central processing unit (CPU) 220 to execute instructions—e.g. stored in a memory 225—which detect and/or control switch processes performed by one or more switching means—e.g. switch ASICs 210a, 210b.

Stackable switch device 200 may operate, at various times, in a stacked mode wherein the stackable switch device 200 operates in combination with one or more other stackable switching devices. This process is referred to herein as stacking. For example, stackable switch device 200 may be communicatively coupled to one or more other switch devices (not shown)—e.g. via a backplane connector 215 of stackable switch device 200—to allow combined operation of the coupled switch devices. A switching means of stackable switch device 200—e.g. one or more of switch ASICs 210a, 210b—may be connected to backplane connector 215 by backplane channels 230, thereby allowing stackable switch device 200 to exchange with another stacked switch device data packets which are switched to/from the network I/O ports 205.

Stackable switch device 200 may include a data packet input capacity—e.g. a bandwidth to receive data packets. For example, the data packet input capacity may include a total of the individual bandwidths of all network I/O ports 205—and/or of the backplane channels 230—to receive data packets for stackable switch device 200. Moreover, stackable switch device 200 may further include a data packet output capacity—e.g. a total of the individual bandwidths of all network I/O ports 205—and/or of the backplane channels 230—to output received data packets from stackable switch device 200. Where a data packet output capacity of stackable switch device 200 is greater than or equal to its data packet input capacity, stackable switch device 200 may be capable of individual non-blocking switching, wherein data packets received by stackable switch device 200 will not be dropped by stackable switch device 200 due to any insufficient output bandwidth of stackable switch device 200. As discussed above, a stacking of stackable switch device 200—e.g. according to system 100—may allow the individual non-blocking capabilities of stackable switch devices including a stackable switch device 200 to be incorporated into a larger combined non-blocking switching for the aggregate plurality of stackable switching devices.

Figure 2B:
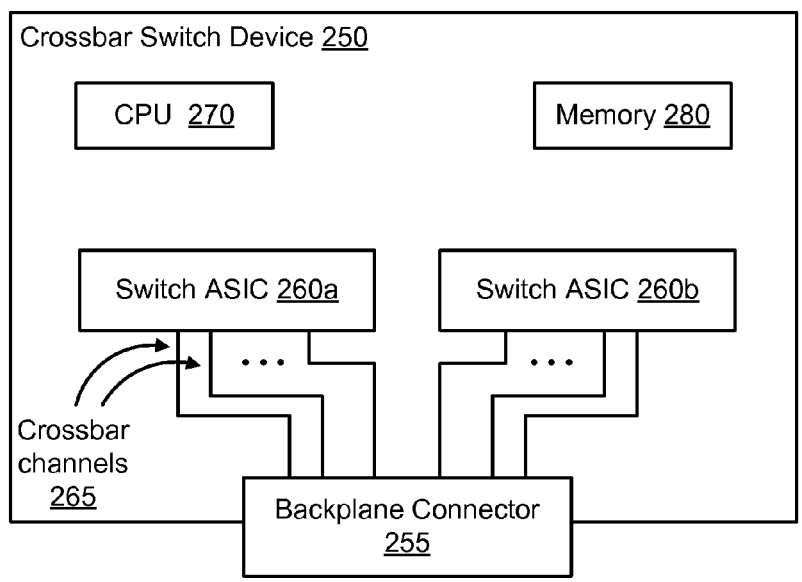
FIG. 2B is a block diagram illustrating select elements of a crossbar switch of a system according to an embodiment.

FIG. 2B illustrates select elements of a crossbar switch device 250 to implement non-blocking switching in a system according to an embodiment. Crossbar switch device 250 may, for example, include one or more features of crossbar switch device 130. In an embodiment, crossbar switch device 250 may include a backplane connector 255 to connect crossbar switch device 250 to a stackable switching device—e.g. via a backplane device according to one embodiment. Backplane connector 255 may include one or more I/O ports (not shown) to exchange data packets—e.g. with one or more connected stackable switch devices. In an embodiment, I/O ports of backplane connector 255 may have features of some or all of I/O ports A0, A1, . . . , A9 and B0, B1, . . . , B9. Crossbar switch device 250 may further include one or more switching means—e.g. switch ASIC 260a and/or switch ASIC 260b—whereby crossbar switch device 250 may operate as a switch matrix providing full switched interconnection between the I/O ports of the backplane connector 255. Crossbar channels 265 of crossbar switch device 250 may connect the backplane connector 255 to the switching means to facilitate such switched interconnection. In an embodiment, a first set of ports (not shown) of backplane connector 255 may be fully interconnected with one another by switch ASIC 260a, and a second set of ports (not shown) of backplane connector 255 may be fully interconnected with one another by switch ASIC 260b.

In various embodiments, crossbar switch device 250 may further include additional means for monitoring and/or managing switched communication of data packets. For example, crossbar switch device 250 may further include a CPU 270 to execute instructions—e.g. stored in a memory 280—which detect and/or control switch processes performed by crossbar switch device 250.

Figure 3:
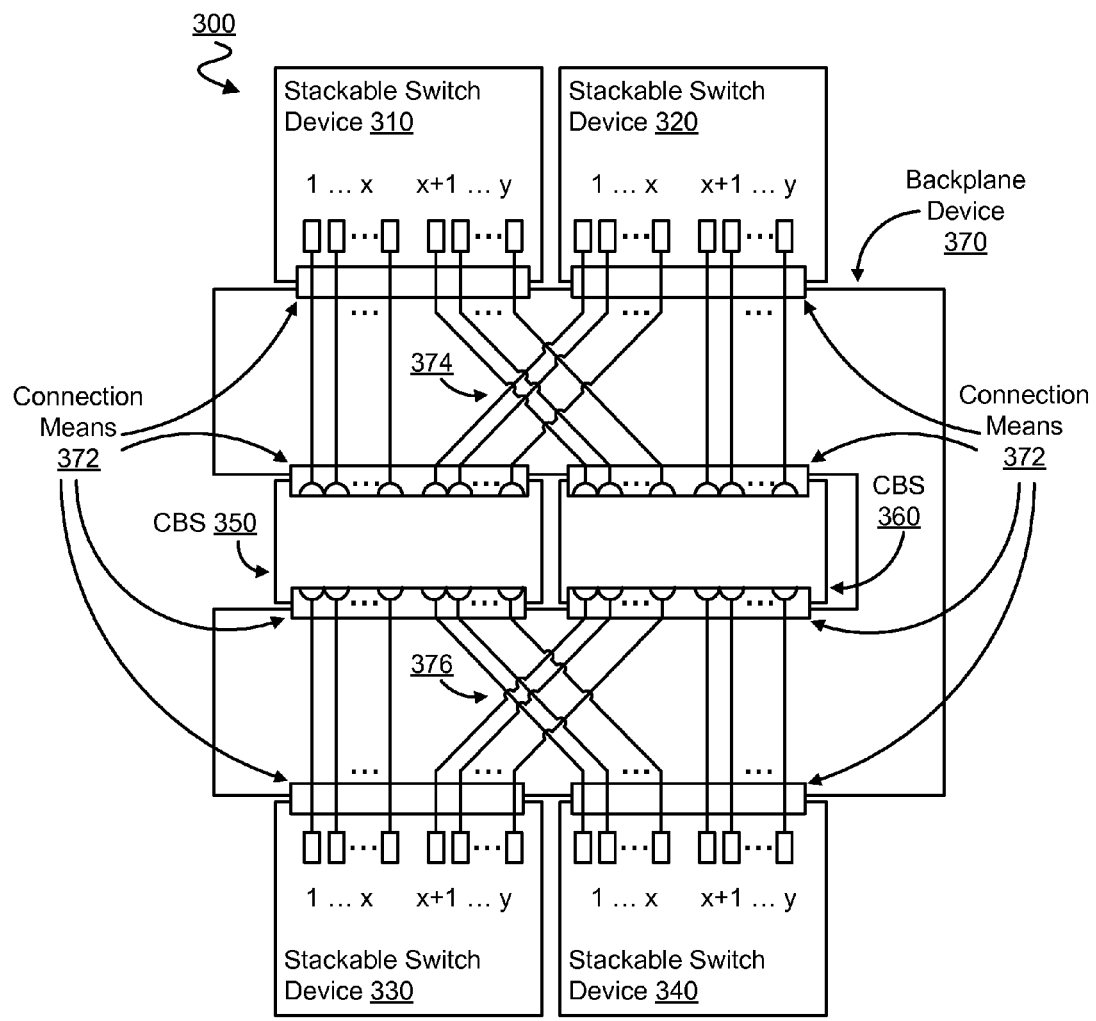
FIG. 3 is a block diagram illustrating select elements of a system of stacked switches according to an embodiment.

FIG. 3 illustrates select elements of a system 300 configured for combined non-blocking switching of a plurality of stackable switch devices according to an embodiment. System 300 may include a plurality of stackable switch devices 310, 320, 330, 340. In an embodiment, one or more of stackable switch devices 310, 320, 330, 340 may include some or all features of stackable switch device 200. It is understood that system 300 may include any of a variety of additional or alternative combinations of stackable switch devices.

By way of illustration and not limitation, each of stackable switch devices 310, 320, 330, 340 is shown to include a respective set of y backplane ports, e.g. where y is some integer greater than an integer x. In an embodiment, y is equal to 2x. It is understood that the stackable switch devices of system 300 may each include any of a variety of additional or alternative combinations of backplane ports. Each of stackable switch devices 310, 320, 330, 340 may exchange data packets with the others of stackable switch devices 310, 320, 330, 340 via its respective y backplane ports.

In addition to being exchanged among stackable switch devices 310, 320, 330, 340 via their respective y backplane ports, data packets may further be exchanged between system 300 and one or more networks (not shown). More particularly, stackable switch devices 310, 320, 330, 340 may each include respective network ports (not shown) whereby system 300 communicates with the one or more networks.

In an embodiment, one or more of stackable switch devices 310, 320, 330, 340 may be capable of individual non-blocking switching. Moreover, a configuration of system 300 may allow the individual non-blocking switching of stackable switch devices 310, 320, 330, 340 to be incorporated into a combined non-blocking switching across the combination of all stackable switch devices 310, 320, 330, 340. For example, system 300 may include one or more crossbar switch devices—e.g. crossbar switch devices CBS 350 and CBS 360—and a backplane device 370 having a plurality of connection means 372. Connection means may include one or more Ethernet connectors, for example. In an embodiment, each one of the connection means 372 connects backplane device 370 to a respective one of the stackable switch devices 310, 320, 330, 340 and the crossbar switch devices CBS 350 and CBS 360. For example, each one of the connection means 372 may be dedicated to connecting only a particular port of a stackable switch device to a particular port of a crossbar switch device.

Connection means 372 may communicatively couple each of the stackable switch devices 310, 320, 330, 340 to each of the one or more crossbar switch devices of system 300. By way of illustration and not limitation, connecting stackable switch device 310 via connection means 372 may result in x backplane ports of stackable switch device 310 being communicatively coupled via signal lines of backplane device 370 to CBS 350, and (y–x) backplane ports of stackable switch device 310 being communicatively coupled via signal lines of backplane device 370 to CBS 360. Similar connections for each of the other stackable switch devices 320, 330, 340 to CBS 350 and CBS 360—e.g. using signal line cross-connections 374, 376—may allow full interconnection of each of the stackable switch devices 310, 320, 330, 340 to each of CBS 350 and CBS 360. Although FIG. 3 shows multiple connection means both for CBS 350 and for CBS 360, it is understood that either one of CBS 350 and CBS 360 may connect to backplane device 370 via a single aggregate connection means. In an embodiment, CBS 350 and/or CBS 360 may connect to backplane device 370 via a single integrated connection means (although Such full interconnection, in combination with the switched matrix operation of CBS 350 and CBS 360, may permit individual non-blocking switching of the stackable switch devices in system 300 to be integrated into a combined non-blocking switching for the entirety of system 300.

Figure 4:
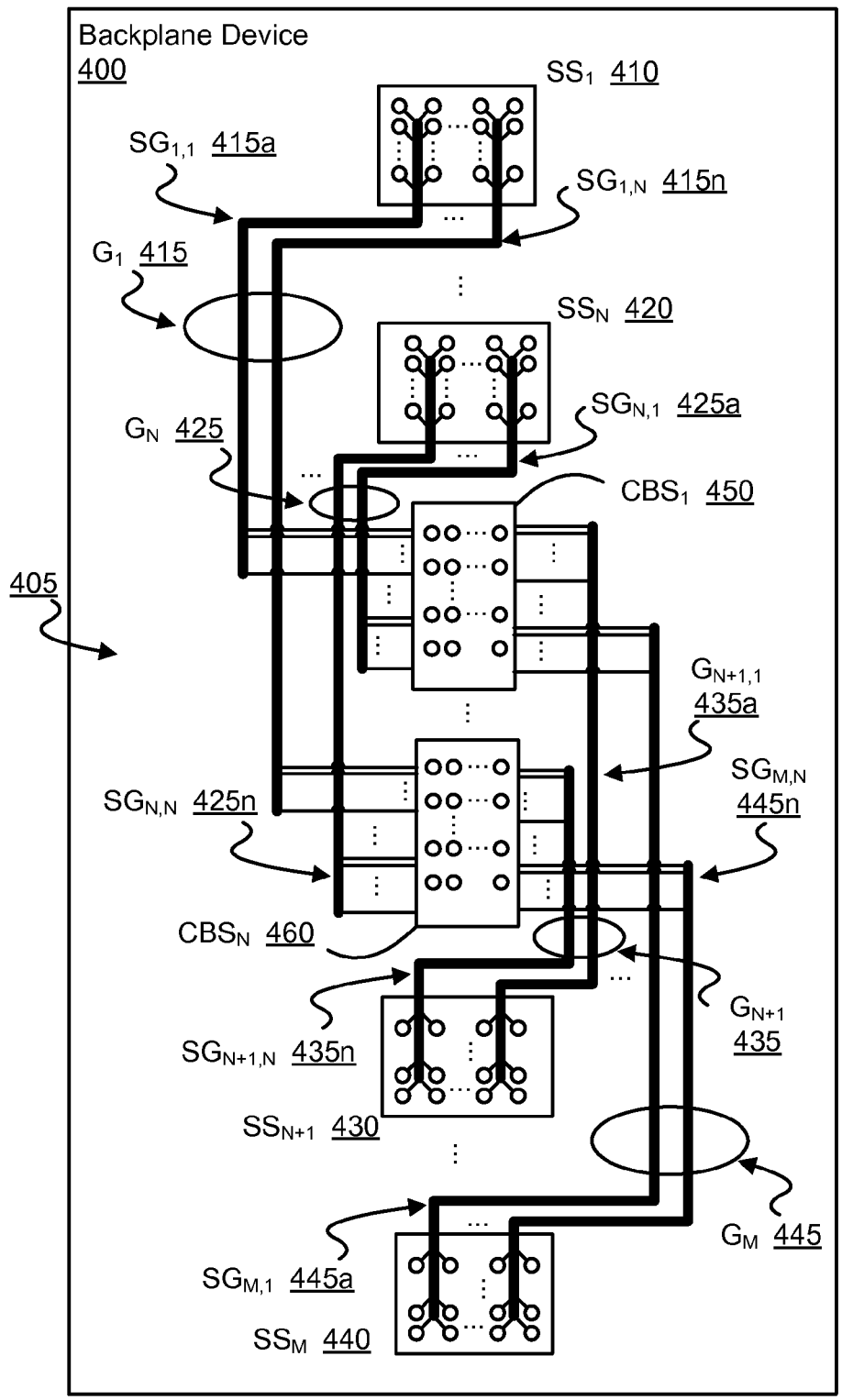
FIG. 4 is a block diagram illustrating select elements of a backplane device according to an embodiment.

FIG. 4 illustrates select elements of a backplane device 400 according to an embodiment. Backplane device 400 may include some or all features of backplane device 370, for example. Backplane device 400 may include a main body 405 such as a plastic or metal housing to physically span a plurality of switching devices (not shown) which are to be connected into a system—e.g. system 300—implementing combined non-blocking switching across a plurality of stackable switch devices. Backplane device 400 may further include a plurality of stackable switch connectors which are positioned and/or supported by the main body 405. By way of illustration and not limitation, backplane device 400 is shown as including M stackable switch connectors $SS_1$ 410, ..., $SS_N$ 420, $SS_{N+1}$ 430, ..., $SS_M$ 440, where M is an integer greater than an integer N. In an embodiment, M is equal to 2N. It is understood that backplane device 400 may include any of a variety of additional or alternative combinations of stackable switch connectors.

Each switch connector of backplane device 400 may include one or more terminals, each to connect to a respective backplane port of a switch device (not shown). The stackable switch connectors $SS_1$ 410, ..., $SS_N$ 420, $SS_{N+1}$ 430, ..., $SS_M$ 440 may be positioned and/or oriented in the main body 405 to facilitate connection of the backplane device 400 to each of a plurality of stackable switch devices. More particularly, stackable switch connectors $SS_1$ 410, ..., $SS_N$ 420, $SS_{N+1}$ 430, ..., $SS_M$ 440 may be arranged with respect to one another to allow connection of each of stackable switch connectors $SS_1$ 410, ..., $SS_N$ 420, $SS_{N+1}$ 430, ..., $SS_M$ 440 to a different respective backplane connector of a stackable switch device. In an embodiment, backplane device 400 may connect to a stackable switch device having some or all of the features of stackable switch device 200. For example, multiple stackable switch devices may be connected to the backplane device 400 while they are physically mounted vertically one on top of one another. Alternatively or in addition the multiple stackable switch devices may be connected to the backplane device 400 while they are positioned within a chassis.

Backplane device 400 may further include one or more crossbar switch connectors which are positioned and/or supported by the main body 405. By way of illustration and not limitation, backplane device 400 is shown as including N crossbar switch connectors $CB_{S1}$ 450, ..., $CB_{SN}$ 460. It is understood that backplane device 400 may include any of a variety of additional or alternative combinations of crossbar switch connectors. The crossbar switch connectors $CB_{S1}$ 450, ..., $CB_{SN}$ 460 may be positioned and/or oriented in the main body 405 to further facilitate connection of the backplane device 400 to one or more crossbar switch devices (not shown). More particularly, crossbar switch connectors $CB_{S1}$ 450, ..., $CB_{SN}$ 460 may be arranged with respect to one another and/or with respect to stackable switch connectors $S_{S1}$ 410, ..., $S_{SN}$ 420, $S_{SN+1}$ 430, ..., $S_{SM}$ 440 to allow connection of each of the crossbar switch connectors $CB_{S1}$ 450, ..., $CB_{SN}$ 460 to a different respective crossbar switch device—e.g. crossbar switch device 250. For example, a crossbar switch device may be connected to the backplane device 400 while it physically mounted vertically above and/or below another stackable switch device and/or crossbar switch device. Alternatively or in addition, a crossbar switch device may be connected to the backplane device 400 while it is held in position in a chassis with another switch device connected to the backplane device 400.

In an embodiment, main body 405 may provide rigid support for easy connection and/or disconnection of switch devices. Backplane device 400 may further include any of a variety of fastening means (not shown) to affix, couple or otherwise fasten the backplane device to a chassis. In various embodiments, such fastening means may include, but is not limited to, screws, bolts, clips, locks, threads, fittings, etc. Such fastening means may allow the backplane device 400 to remain in affixed to a chassis as a switching device is connected to (or disconnected from) backplane device 400.

Backplane device 400 may include a plurality of signal lines to variously provide for data communication between switch connectors of the backplane device 400. In an embodiment, the plurality of signal lines may include a different respective set of signal lines for each stackable switch connector of the backplane device 400. By way of illustration and not limitation, the plurality of signal lines of backplane device 400 may include the sets of signal lines $G_1$ 415, ..., $G_N$ 425, $G_{N+1}$ 435, ..., $G_M$ 445 which correspond, respectively, to the stackable switch connectors $SS_1$ 410, ..., $SS_N$ 420, $SS_{N+1}$ 430, ..., $SS_M$ 440. In an embodiment, each signal line in a set of signal lines connects to the respective stackable switch connector of the respective set of signal lines. It is understood that backplane device 400 may include any of a variety of additional or alternative sets of signal lines for respective stackable switch connectors. Backplane device 400 may additionally include a power line (not shown) to deliver power to one or more switch devices connected thereto.

In an embodiment, a set of signal lines for a respective stackable switch connector in backplane device 400 may include for each of the one or more crossbar switch connectors of the backplane device 400 a respective subset having one or more signal lines of the set of signal lines. For the sake of brevity, such a subset is referred to herein as a subset of one or more signal lines. For example, $G_1$ 415 may include subsets $SG_{1,1}$ 415a through $SG_{N,N}$ 415n, $G_N$ 425 may include subsets $SG_{N,1}$ 425a through $SG_{N,N}$ 425n, $G_{N+1}$ 435 may include subsets $SG_{N+1,1}$ 435a through $SG_{N+1,N}$ 435n, and $G_M$ 445 may include subsets $SG_{M,1}$ 445a through $SG_{M,N}$ 445n.

In an embodiment, for a given set of signal lines of a respective stackable switch connector, each subset of one or more signal lines in the given set also connects the respective stackable switch connector to a different respective crossbar switch connector corresponding to that subset of one or more signal lines. For example, subsets $SG_{1,1}$ 415a, ... $SG_{N,1}$ 425a, $SG_{N+1,1}$ 435a, ... $SG_{M,1}$ 445a may each be associated with— e.g. connect to—$CBS_1$ 450. Alternately or in addition, subsets $SG_{N,N}$ 415n, ... $SG_{N,N}$ 425n, $SG_{N+1,N}$ 435n, ... $SG_{M,N}$ 445n may each be associated with—e.g. connect to—$CBS_N$ 460. Backplane device 400 may include any of a variety of additional or alternate combinations of signal line subsets connecting to crossbar switch devices. The configuration of signal lines in backplane device 400 may enable each stackable switch which is connected to backplane device 400 to provide an equal data packet bandwidth to each switch ASIC of a given crossbar switch which is connected to backplane device 400—e.g. via $CBS_1$ 450. In certain embodiments, the configuration of signal lines in backplane device 400 may further enable each stackable switch connected to backplane device 400 to provide an equal data packet bandwidth to each crossbar switch which is connected to backplane device 400.

The supportive housing of main body 405 and the relative configuration in backplane device 400 of stackable switch connectors, crossbar switch connectors and sets of signal lines allows for quick and easy connection/disconnection of switch devices for configuring and/or reconfiguring combined non-blocking switching across for the plurality of stackable switch devices. Main body 405 may additionally include one or more external visual indicators—e.g. symbols and/or signs—to distinguish to a user a stackable switch connector from a crossbar switch connector.

Figure 5:
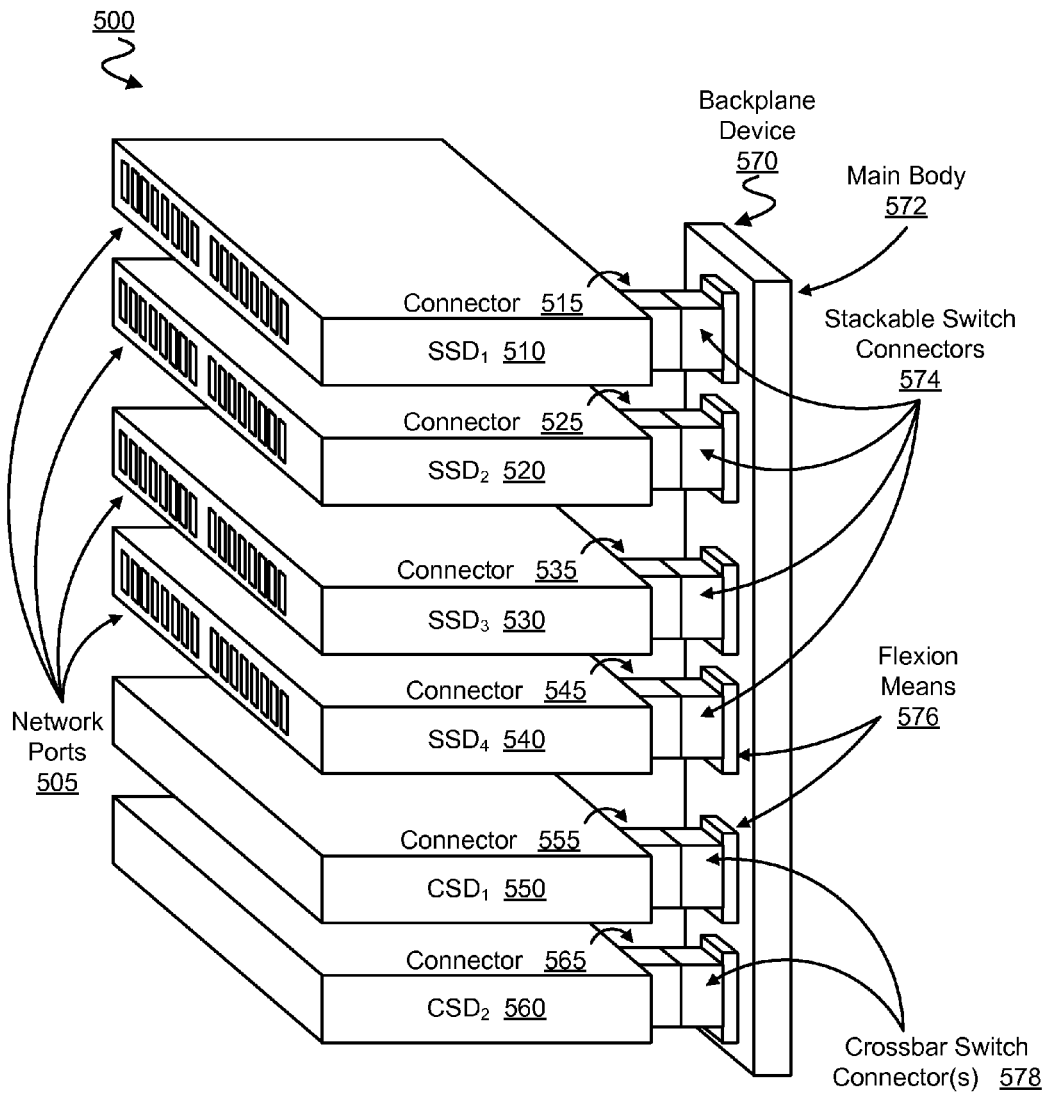
FIG. 5 is a diagram illustrating select elements of a system of stacked switches according to an embodiment.

FIG. 5 illustrates select elements of a system 500 according to an embodiment of the invention. In an embodiment, system 500 may include some or all features of system 400. System 500 may include a plurality of stackable switch devices—e.g. switch devices $SSD_1$ 510, $SSD_2$ 520, $SSD_3$ 530 and $SSD_4$ 540. Network ports 505 of $SSD_1$ 510, $SSD_2$ 520, $SSD_3$ 530 and $SSD_4$ 540 may allow system 500 to exchange data packets with one or more networks (not shown). In an embodiment, each of $SSD_1$ 510, $SSD_2$ 520, $SSD_3$ 530 and $SSD_4$ 540 is individually capable of implementing its own non-blocking switching.

System 500 may stack $SSD_1$ 510, $SSD_2$ 520, $SSD_3$ 530 and $SSD_4$ 540 to incorporate non-blocking switching of individual switch devices into a combined non-blocking switching across multiple stackable switching devices. For example, system 500 may include one or more crossbar switch devices—illustrated in FIG. 5 as crossbar switch devices $CSD_1$ 550 and $CSD_2$ 560. In an embodiment, $SSD_1$ 510, $SSD_2$ 520, $SSD_3$ 530, $SSD_4$ 540, $CSD_1$ 550 and $CSD_2$ 560 include, respectively, connectors 515, 525, 535, 545, 555 and 565 to connect to a backplane device 570 of system 500. More particularly, backplane device may include a main body 572 to physically span $SSD_1$ 510, $SSD_2$ 520, $SSD_3$ 530, $SSD_4$ 540, $CSD_1$ 550 and $CSD_2$ 560. The particular order in which stackable switch devices and crossbar switch devices are positioned with respect to one another along the length of main body 572 may vary, according to various embodiments. In an embodiment, the location of one or more connectors on backplane device 570a may allow positioning of a crossbar switch device in between two stackable switch devices along the length of main body 572—e.g. to allow comparatively shorter signal lines within backplane device 570.

Main body 572 may position and/or support stackable switch connectors 574 to connect to the connectors 515, 525, 535 and 545. Alternatively or in addition, main body 572 may position and/or support crossbar switch connectors 578 to connect to connectors 555 and 565. In an embodiment, some or all of the stackable switch connectors 574 and crossbar switch connectors 578 may variously include flexion means 576—e.g. a swivel or other flexible joint—to accommodate easy connection (or disconnection) of backplane device to (or from) one or more of $SSD_1$ 510, $SSD_2$ 520, $SSD_3$ 530, $SSD_4$ 540, $CSD_1$ 550 and $CSD_2$ 560.

Main body 572 may house a plurality of signal lines (not shown), such as those described in relation to backplane device 400, to variously interconnect one or more of stackable switch connectors 574 with one or more of the crossbar switch connectors 578. The relative configuration of switch connectors 574, crossbar switch connectors 578 and signal lines in main body 572 may allow backplane device 570 to be easily connected to (and/or disconnected from) one or more of $SSD_1$ 510, $SSD_2$ 520, $SSD_3$ 530, $SSD_4$ 540, $CSD_1$ 550 and $CSD_2$ 560, wherein the fully connected system 500 demonstrates a combined non-blocking switching across the aggregate of stackable switch devices $SSD_1$ 510, $SSD_2$ 520, $SSD_3$ 530 and $SSD_4$ 540.

Techniques and architectures for connecting network devices are described herein. In the above description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Besides what is described herein, various modifications may be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A backplane device comprising:
    a main body to physically span in a first direction a plurality of stackable switch devices and one or more crossbar switch devices, wherein all of the plurality of stackable switch devices and the one or more crossbar switch devices are stacked with each other in the first direction;
    a plurality of stackable switch connectors coupled to the main body, each stackable switch connector to couple to a respective one of the plurality of stackable switch devices;
    one or more crossbar switch connectors coupled to the main body, each crossbar switch connector to couple to a respective one of the one or more crossbar switch devices; and
    a plurality of signal lines including a different respective set of signal lines for each of the stackable switch connectors, the plurality of signal lines having a configuration wherein
        for each of the stackable switch connectors, the respective set of signal lines for the stackable switch connector includes a different respective subset of one or more signal lines for each of the one or more crossbar switch connectors, and
        wherein for each of the subsets of one or more signal lines in the respective set of signal lines, each signal line of the subset of one or more signal lines is to couple the respective stackable switch connector for the set of signal lines with the respective crossbar switch connector for the subset of one or more signal lines.

2. The backplane device of claim 1, wherein each signal line of each subset of one or more signal lines is to couple only one stackable switch connector with one crossbar switch connector.

3. The backplane device of claim 1, further comprising connecting means to secure the backplane device to a chassis.

4. The backplane device of claim 1, wherein the one or more crossbar switch connectors comprise N crossbar switch connectors, and wherein the plurality of stackable switch connectors comprises 2N stackable switch connectors.

5. The backplane device of claim 4, wherein each stackable switch connector is connected to kN of the plurality of signal lines, where k is an integer, and wherein for each of the plurality of stackable switch connectors, the stackable switch connector is connected to each of the one or more crossbar switch connectors by a different respective k signal lines of the plurality of signal lines.

6. The backplane device of claim 1, further comprising a power line to deliver power to one or more switch devices.

7. A system comprising:
    a plurality of stackable switch devices;
    one or more crossbar switch devices to exchange data packets with the plurality of stackable switch devices, wherein all of the plurality of stackable switch devices and the one or more crossbar switch devices are stacked with each other in a first direction; and a backplane device coupled to the plurality of stackable switch devices and to the one or more crossbar switch devices, the backplane device including:

a main body to physically span in the first direction the plurality of stackable switch devices and the one or more crossbar switch devices;

a plurality of stackable switch connectors coupled to the main body, each stackable switch connector coupled to a respective one of the plurality of stackable switch devices;

one or more crossbar switch connectors coupled to the main body, each crossbar switch connector coupled to a respective one of the one or more crossbar switch devices; and a plurality of signal lines including a different respective set of signal lines for each of the stackable switch connectors, the plurality of signal lines having a configuration wherein for each of the stackable switch connectors, the respective set of signal lines for the stackable switch connector includes a different respective subset of one or more signal lines for each of the one or more crossbar switch connectors, and wherein for each of the subsets of one or more signal lines in the respective set of signal lines, each signal line of the subset of one or more signal lines is to couple the respective stackable switch connector for the set of signal lines with the respective crossbar switch connector for the subset of one or more signal lines.

8. The system of claim 7,
wherein for each of the plurality of stackable switch devices, a total data packet output capacity of the stackable switch is equal to or greater than a total data packet input capacity of the stackable switch; and wherein coupling the backplane device to the plurality of stackable switch devices and to the one or more crossbar switch devices further provides for a total data packet output capacity of the plurality of stackable switch devices being equal to or greater than a total data packet input capacity of the plurality of stackable switch devices.

9. The system of claim 7, wherein each signal line of each subset of one or more signal lines is to couple only one stackable switch connector with one crossbar switch connector.

10. The system of claim 7, further comprising a chassis to store one or more switch devices, the backplane device further including connecting means to secure the backplane device to a chassis.

11. The system of claim 7, wherein the one or more crossbar switch connectors comprise N crossbar switch connectors, and wherein the plurality of stackable switch connectors comprises 2N stackable switch connectors.

12. The system of claim 11, wherein each stackable switch connector is connected to kN of the plurality of signal lines, where k is an integer, and wherein for each of the plurality of stackable switch connectors, the stackable switch connector is connected to each of the one or more crossbar switch connectors by a different respective k signal lines of the plurality of signal lines.

13. The system of claim 7, further comprising a power line to deliver power to one or more switch devices.

14. A backplane device comprising:
a main body to physically span in a first direction a plurality of stackable switch devices and one or more crossbar switch devices, wherein all of the plurality of stackable switch devices and the one or more crossbar switch devices are stacked with each other in the first direction;

a plurality of stackable switch connecting means coupled to the main body, each stackable switch connecting means for coupling to a respective one of the plurality of stackable switch devices;

one or more crossbar switch connecting means coupled to the main body, each crossbar switch connecting means for coupling to a respective one of the one or more crossbar switch devices; and a plurality of signal lines including a different respective set of signal lines for each of the stackable switch connecting means, the plurality of signal lines having a configuration wherein for each of the stackable switch connecting means, the respective set of signal lines for the stackable switch connecting means includes a different respective subset of one or more signal lines for each of the one or more crossbar switch connecting means, and wherein for each of the subsets of one or more signal lines in the respective set of signal lines, each signal line of the subset of one or more signal lines is to couple the respective stackable switch connecting means for the set of signal lines with the respective crossbar switch connecting means for the subset of one or more signal lines.

15. The backplane device of claim 14, further comprising connecting means to secure the backplane device to a chassis.

16. The backplane device of claim 14, further comprising a flexion means to couple the main body to one of the plurality of stackable switch connecting means and the one or more crossbar switch connecting means, the flexion means to flexibly accommodate connection of a switch device to the backplane device.

* * * * *